United States Patent
Roth et al.

(10) Patent No.: US 9,376,005 B2
(45) Date of Patent: Jun. 28, 2016

(54) METHOD FOR OPERATING A HYBRID VEHICLE

(71) Applicant: Dr. Ing. h.c. F. Porsche Aktiengesellschaft, Stuttgart (DE)

(72) Inventors: Martin Roth, Rutesheim (DE); Markus Goehring, Nufringen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/244,480

(22) Filed: Apr. 3, 2014

(65) Prior Publication Data

US 2014/0299395 A1    Oct. 9, 2014

(30) Foreign Application Priority Data

Apr. 3, 2013   (DE) .......................... 10 2013 103 306

(51) Int. Cl.
*B60K 6/44* (2007.10)
*B60K 6/52* (2007.10)
*B60K 6/48* (2007.10)

(52) U.S. Cl.
CPC ... *B60K 6/44* (2013.01); *B60K 6/52* (2013.01); *B60K 2006/4825* (2013.01); *B60W 2510/0666* (2013.01); *B60W 2510/085* (2013.01); *Y02T 10/623* (2013.01); *Y02T 10/6252* (2013.01); *Y02T 10/6265* (2013.01); *Y10S 903/903* (2013.01)

(58) Field of Classification Search
CPC ...... B60K 17/354; B60K 17/356; B60K 6/42; B60K 6/44; B60K 6/46; B60K 6/52

USPC ............... 180/242, 243, 65.22, 65.225, 65.25
See application file for complete search history.

(56) References Cited

U.S. PATENT DOCUMENTS

| | | | |
|---|---|---|---|
| 6,209,672 B1 * | 4/2001 | Severinsky | B60K 6/442 180/65.23 |
| 7,216,943 B2 * | 5/2007 | Nishikawa et al. | 303/152 |
| 7,971,666 B2 | 7/2011 | Yamazaki et al. | |

(Continued)

FOREIGN PATENT DOCUMENTS

| DE | 10 2008 025 025 | 1/2009 |
|---|---|---|
| DE | 10 2011 000 609 | 8/2012 |
| DE | 10 2011 051 439 | 1/2013 |

OTHER PUBLICATIONS

German Search Report of Dec. 17, 2013.

*Primary Examiner* — Bryan Evans
(74) *Attorney, Agent, or Firm* — Gerald E. Hespos; Michael J. Porco; Matthew T. Hespos

(57) ABSTRACT

A method is provided for operating a hybrid vehicle. The hybrid vehicle has an internal combustion engine and a first electric machine, to which a common input shaft of a transmission is assigned, for driving a first axle of the hybrid vehicle. The hybrid vehicle also has a second electric machine for driving a second axle of the hybrid vehicle, and a traction battery is provided for the two electric machines. The electric machines have a total power greater than the power of the internal combustion engine. The method includes operating the first electric machine in a generator mode for charging the traction battery when the hybrid vehicle is driven exclusively by internal combustion engine. The method ensures, with a high level of electrification, a long electromotive travelling range of the vehicle.

9 Claims, 1 Drawing Sheet

(56) References Cited

U.S. PATENT DOCUMENTS

| | | | |
|---|---|---|---|
| 7,980,349 B2 * | 7/2011 | Sato | B60K 6/52 180/242 |
| 8,571,739 B2 | 10/2013 | Fleckner et al. | |
| 2009/0093336 A1 | 4/2009 | Soliman et al. | |
| 2010/0000808 A1 * | 1/2010 | Delisle et al. | 180/65.265 |
| 2011/0083309 A1 * | 4/2011 | Kshatriya | B60K 1/00 29/401.1 |

* cited by examiner

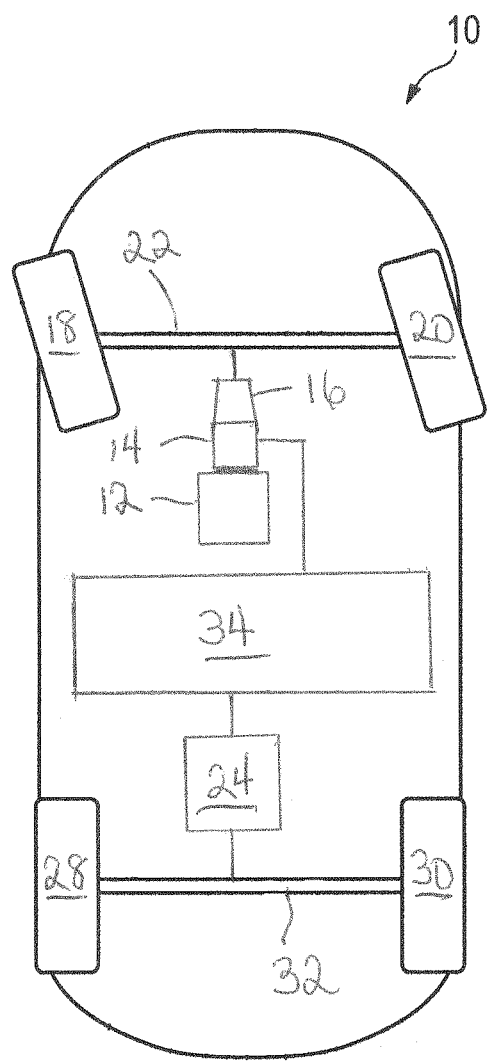

METHOD FOR OPERATING A HYBRID VEHICLE

CROSS REFERENCE TO RELATED APPLICATION

This application claims priority under 35 USC 119 to German Patent Appl. No. 10 2013 103 306.7 filed on Apr. 3, 2013, the entire disclosure of which is incorporated herein by reference.

BACKGROUND

1. Field of the Invention

The invention relates to a method for operating a hybrid vehicle that has an internal combustion engine and a first electric machine to which a common input shaft of a transmission is assigned for driving a first axle of the hybrid vehicle. The hybrid vehicle also has a second electric machine for driving a second axle of the hybrid vehicle. A traction battery is provided for the two electric machines and can be charged when the first electric machine is in a generator mode.

2. Description of the Related Art

A parallel hybrid vehicle has an internal combustion engine and an electric machine that are assigned to a first axle and that act on a common drivetrain. Thus, at least in one operating state, the forces or torques of the drives are available simultaneously.

Methods for operating such a hybrid vehicle are known from U.S. 2009/0093336 A1 and DE 10 2011 000 609 A1.

It is an object of the invention to provide a method for operating such a hybrid vehicle so that, with a high level of electrification, a long electromotive travelling range of the vehicle is ensured.

SUMMARY OF THE INVENTION

The object is achieved in that the electric machines have a total power greater than the power of the internal combustion engine. The first electric machine is operated in the generator mode in an operating state in which the hybrid vehicle is driven exclusively by internal combustion engine.

The method of the invention makes it possible for the hybrid vehicle to be operated to cover very large distances purely electrically. When required, the internal combustion engine drives the electric machine, which is operated as a generator to recharge the traction battery. Furthermore, in a hybrid vehicle of this type, it is possible for the internal combustion engine to always be operated as a function of the vehicle speed, thereby permitting a familiar sporty driving experience.

The operating strategy of the hybrid vehicle is to provide a relatively high minimum state of charge of the traction battery. Thus, there is only relatively little power available when the hybrid vehicle is being driven by the internal combustion engine. It is therefore necessary, in the event of temporary power demand, to use an electric machine that is always operated as a motor. Sufficient electrical energy must be available in the traction battery for this purpose. Therefore, during the time period in which the hybrid vehicle is driven exclusively by internal combustion engine, the electric machine is operated as a generator to recharge the electrical energy store. It is not necessary for the electric machine to be operated as a generator for the entire time period in which the hybrid vehicle is driven exclusively by internal combustion engine.

The electric machines have a total power greater than the power of the internal combustion engine. Therefore, operation of the hybrid vehicle with a high level of electrification is possible. In the electric driving mode, it should be sought to discharge the traction battery only as far as a base state of charge, because in the subsequent operation with drive provided by the internal combustion engine, only a relatively small amount of drive power of the internal combustion engine is available. Hence, for temporary power demand peaks, electrical assistance must be provided relatively frequently, for example for boosting. To permit this, it is necessary for recharging to be performed by the internal combustion engine between the boost processes to keep the state of charge in the traction battery constant on average.

The method of the invention ensures good overall efficiency of the hybrid vehicle even in operation with drive provided by the internal combustion engine. A familiar, sporty driving experience is possible in operation with drive provided by the internal combustion engine, for example from the aspect of the gearshift processes to be performed. The internal combustion engine and the transmission may be selected, in an inexpensive manner, from mass-production construction sets, for example of compact vehicles with a front-transverse engine configuration.

To achieve the high level of electrification of the traction battery, the traction battery should be of correspondingly large dimensions.

The traction battery preferably can be charged by connection to a fixed power supply network. In this respect, the hybrid vehicle additionally has a connection to the fixed power supply network (plug-in).

The maximum power of the first electric machine preferably is approximately 90 kW, and the maximum power of the second electric machine preferably is approximately 90 kW. The maximum power of the internal combustion engine preferably is approximately 160 kW, in particular 162 kW. Such a level of power is generated for example by a 4-cylinder internal combustion engine with a displacement of 1.4 l. A tank for accommodating fuel for the internal combustion engine preferably is arranged in the region of the front axle and thus in the region of the one electric machine. The fuel tank preferably has a volume of approximately 45 l.

The electric machine power, and thus the power of the two electric machines, is greater than the power of the internal combustion engine.

BRIEF DESCRIPTION OF THE DRAWING

FIG. 1 is a schematic illustration of a hybrid motor vehicle in accordance with an embodiment of the invention.

DETAILED DESCRIPTION OF THE PREFERRED EMBODIMENT

A hybrid motor vehicle in accordance with an embodiment of the invention is identified generally by the numeral 10 in FIG. 1. The hybrid vehicle 10 has an internal combustion engine 12 and a first electric machine 14 that are assigned to a common input shaft of a transmission 16 for driving the wheels 18 and 20 of a first axle 22. The hybrid vehicle 10 further has a second electric machine 24 for driving the wheels 28 and 30 of a second axle 32. In the illustrated embodiment, the internal combustion engine 12 and the first electric machine 14 are arranged for driving the front axle 22, while the second electric machine 24 is arranged for driving the rear axle 32. However, the opposite disposition of these components is equally possible. The hybrid vehicle 10 further includes a traction battery 34, which in the illustrated embodiment is between the first and second axles 22 and 32. This disposition of the traction battery 34 is convenient in view of the large size of the traction battery 34 to deliver the preferred power to the electric machines 14 and 24 as explained herein. The traction battery 34 is connected to both the first and second electric machines 14 and 24. In this regard, the traction battery 34 can deliver power to both the first and second electric machines 14 and 24 so that the first and second electric machines 14 and 24 can be used as motors for driving the hybrid vehicle 10. Additionally, the first electric machine 14 can be operated as a generator to recharge the traction battery 34. In this regard, the internal combustion engine 12 can be used to drive for the first electric machine 14 so that the first electric machine is operated as a generator to recharge the traction battery 34. However, the internal combustion engine 12 also can be used alone or in combination with the first and/or second electric machines 14 and 24 to power the hybrid vehicle 10 depending upon speed demands and the state of charge of the traction battery 34. Thus in certain circumstances, the internal combustion engine 12 and both electric machines 14 and 24 can be used to power the hybrid vehicle 10 to provide a sporty driving experience. The hybrid vehicle 10 also can be configured as a plug-in hybrid vehicle 10 so that the traction battery 34 can be recharged by a fixed power source in addition to being recharged by the first electric machine 14 operated as a generator.

The first and second electric machines 14 and 24 are configured to provide a combined power that is greater than the maximum power of the internal combustion engine 12. In certain embodiments, the combined power of the first and second electric machines 14 and 24 is at least twice the power of the internal combustion engine 12. In one embodiment, the first electric machine 14 is configured to provide a maximum power output of approximately 90 kW, and similarly the second electric machine 24 is configured to provide a maximum power output of 90 kW. In this embodiment, the maximum power of the internal combustion engine 12 may be approximately 160 kW. An internal combustion engine 12 with a maximum power output of approximately 160 kW can be configured as a four-cylinder internal combustion engine 12 with a displacement of approximately 1.4 L. The hybrid vehicle 10 can be operated very efficiently with this arrangement, and hence a relatively small fuel tank of approximately 45 L will be sufficient. The fuel tank (not shown) can be disposed in proximity to the front axle 22, and hence in close proximity to the internal combustion engine 12. The ability of the hybrid vehicle 10 to operate in an efficient and sporty manner with a relatively small internal combustion engine 12 permits a correspondingly small and inexpensive transmission 16. The relatively small internal combustion engine 12 and the correspondingly small and inexpensive transmission 16 reduce the overall price of the hybrid vehicle 10.

During operating conditions that require peak power demands, the internal combustion engine 12 and the first electric machine 14 will be used simultaneously to drive the first axle 22, while the second electric machine 24 will be used to drive the second axle 32. These periods of peak power demand may be referred to as boosting and may occur when performing a passing maneuver with the hybrid vehicle 10 or when accelerating out of a turn. The internal combustion engine 12 also may be operated during periods of lower power demand to contribute to driving the first axle 22. However, during these periods, the internal combustion engine 12 also is used to drive the first electric machine 14, which is operated as a generator to recharge the traction battery 34 and hence to maintain a high state of charge for the traction battery 34.

Thus, during certain operating conditions, the internal combustion engine 12 drives the first axle 22 and simultaneously operates the first electric machine 14 to recharge the traction battery 34, while the traction battery 34 also is delivering power to the second electric machine 24 for driving the second axle 32. During other operating conditions, the hybrid vehicle 10 may be powered purely by the second electric machine 24, while the internal combustion engine 12 powers and the first electric machine 14 to operate as a generator for recharging the traction battery 34. In a preferred embodiment, the internal combustion engine 12 always is operated when the state of charge of the traction battery 34 is at or below a relatively high state of charge so that sufficient power is available from the traction battery 34 for purely electric driving over long distances.

What is claimed is:

1. A method for operating a hybrid vehicle that has an internal combustion engine and a first electric machine, to which a common input shaft of a transmission is assigned, for driving a first axle of the hybrid vehicle, and the hybrid vehicle has a second electric machine for driving a second axle of the hybrid vehicle, and furthermore the hybrid vehicle has a traction battery for the two electric machines, the electric machines have a total power greater than a maximum power of the internal combustion engine, the method comprising:

sensing a state of charge of the traction battery;
comparing the sensed state of charge of the traction battery to a predetermined minimum state of charge;
operating the internal combustion engine at least when the sensed state of charge of the traction battery is below the predetermined minimum state of charge;
using at least part of an output of the internal combustion engine for operating the first electric machine in a generator mode for charging the traction battery when the sensed state of charge of the traction battery is below the predetermined minimum state of charge; and
when the sensed state of charge of the traction battery is above the predetermined minimum state of charge:
using the second electric machine to drive the second axle of the hybrid vehicle; and/or
using at least one of the first electric machine and the internal combustion engine to drive the first axle of the hybrid vehicle, wherein
the internal combustion engine is used continuously during operation of the hybrid vehicle for at least one of operating the first electric machine in a generator mode for charging the traction battery and driving the first axle.

2. The method of claim 1, further comprising operating the hybrid vehicle with a relatively high minimum state of charge of the traction battery.

3. The method of claim 1, wherein the two electric machines have a total power of approximately 180 kW and the internal combustion engine has a power of approximately 160 kW.

4. The method of claim 3, wherein the power of each respective electric machine is approximately 90 kW.

5. The method of claim 4, wherein the traction battery for operation of the electric machines is of large dimensions.

6. The method of claim 4, wherein the traction battery is chargeable by connection to a fixed power supply network.

7. The method of claim 1, further comprising using a first part of the output of the internal combustion engine for driving the first axle and a second part of the output of the internal combustion engine for operating the first electric machine in a generator mode for charging the traction battery, while simultaneously using the second electric machine to drive the second axle during selected operating conditions.

8. The method of claim 1, further comprising using the second electric machine to boost a power output of the hybrid vehicle beyond a maximum power output of the internal combustion engine during peak power demands.

9. The method of claim 1, further comprising using part of the output of the internal combustion engine for operating the first electric machine in a generator mode for charging the traction battery whenever the hybrid vehicle is driven exclusively by the internal combustion engine.

* * * * *